US007110523B2

(12) United States Patent  
Gagle et al.

(10) Patent No.: US 7,110,523 B2  
(45) Date of Patent: Sep. 19, 2006

(54) SYSTEM AND METHOD FOR DISTRIBUTING AND ROUTING CALLS IN A CALL CENTER

(75) Inventors: Michael D. Gagle, Lafayette, IN (US); Michael Schmidt, Carmel, IN (US)

(73) Assignee: Interactive Intelligence, Inc., Indianapolis, IN (US)

( * ) Notice: Subject to any disclaimer, the term of this patent is extended or adjusted under 35 U.S.C. 154(b) by 390 days.

(21) Appl. No.: 10/449,249

(22) Filed: May 30, 2003

(65) Prior Publication Data

US 2004/0240659 A1 Dec. 2, 2004

(51) Int. Cl.  
*H04M 3/00* (2006.01)  
*H04M 5/00* (2006.01)

(52) U.S. Cl. .............................. 379/265.01; 379/266.01
(58) Field of Classification Search ............................... 379/265.01–266.1, 309, 211.01, 211.02, 379/212.01  
See application file for complete search history.

(56) References Cited

U.S. PATENT DOCUMENTS

| 5,036,535 | A | * | 7/1991 | Gechter et al. | 379/265.11 |
| 5,249,223 | A | * | 9/1993 | Vanacore | 379/266.06 |
| 5,274,700 | A | * | 12/1993 | Gechter et al. | 379/211.01 |
| 5,450,482 | A | * | 9/1995 | Chen et al. | 379/230 |
| 5,524,147 | A | | 6/1996 | Bean | |
| 5,590,188 | A | * | 12/1996 | Crockett | 379/265.02 |
| 5,742,675 | A | | 4/1998 | Kilander et al. | |
| 5,915,012 | A | | 6/1999 | Miloslavsky | |
| 5,991,391 | A | | 11/1999 | Miloslavsky | |
| 5,995,614 | A | | 11/1999 | Miloslavsky | |
| 5,995,615 | A | * | 11/1999 | Miloslavsky | 379/265.11 |
| 6,091,811 | A | * | 7/2000 | Chang et al. | 379/265.02 |
| 6,115,693 | A | | 9/2000 | McDonough et al. | |
| 6,134,530 | A | | 10/2000 | Bunting et al. | |
| 6,175,564 | B1 | * | 1/2001 | Miloslavsky et al. | 370/352 |
| 6,256,489 | B1 | * | 7/2001 | Lichter et al. | 455/404.2 |
| 6,259,786 | B1 | | 7/2001 | Gisby | |
| 6,263,066 | B1 | | 7/2001 | Shtivelman et al. | |
| 6,289,094 | B1 | | 9/2001 | Miloslavsky | |
| 6,366,668 | B1 | | 4/2002 | Borst et al. | |
| 6,373,836 | B1 | | 4/2002 | Deryugin et al. | |
| 6,393,018 | B1 | | 5/2002 | Miloslavsky | |
| 6,449,260 | B1 | | 9/2002 | Sassin et al. | |
| 6,466,661 | B1 | * | 10/2002 | Krank et al. | 379/212.01 |
| 6,493,446 | B1 | * | 12/2002 | Cherry | 379/265.05 |

(Continued)

OTHER PUBLICATIONS

"Aspect IP Network InterQueue," http://www.aspect.com/mm/pdf/products/ipcontact/Aspect_ID_Network_IQ_ds.pdf, May 18, 2002.

*Primary Examiner*—Benny Quoc Tieu  
(74) *Attorney, Agent, or Firm*—Woodard, Emhardt, Moriarty, McNett & Henry LLP

(57) ABSTRACT

A computer system and method is disclosed that includes a call queue server that receives incoming calls and routes the calls to a telephone at the agent's workstation only after the agent accepts the request to take the call. A system and method is disclosed that includes a plurality of call queue servers, a queue monitor server, and a plurality of agent workstations, for distributing calls across multiple call center locations. Each call queue server receiving an incoming call sends a notification to the queue monitor server that in turn notifies each of the remaining call queue servers about the call. Each call queue server is thus able to maintain a current view of all activity across multiple call centers.

28 Claims, 3 Drawing Sheets

U.S. PATENT DOCUMENTS 6,850,612 B1 * 2/2005 Johnson et al. ........ 379/265.02

6,925,162 B1 * 8/2005 Porter et al. ........... 379/211.02

* cited by examiner

SYSTEM AND METHOD FOR DISTRIBUTING AND ROUTING CALLS IN A CALL CENTER

BACKGROUND OF THE INVENTION

The present invention relates to call centers, and more particularly, but not exclusively, relates to distributing and routing calls in a call center.

In a call center, various methods are used to detect the availability of a desired agent to handle a call. If the system determines the agent appears to be available, the call is actually routed to the agent. However, there is no guarantee that the agent will remain available until the routing is completed. Frequently, calls are transferred to an agent that appeared to be available, but who does not answer the newly routed call.

This difficulty can be particularly acute when calls that originate at one call center site are routed to an agent at another geographically separated call center site. Frequently, in a call center that spans multiple geographic locations, the call center site that initially receives the call polls the other call center sites to determine where the best-suited agent is located. The call then gets routed to that agent automatically even though the identified agent may not be available. The call might then have to be routed to yet another call center with an available agent, resulting in a large amount of network traffic and/or delay to the caller. Or, the caller may end up in an agent's voice mail. In view of such limitations, there is a need for further advancements in this area.

SUMMARY OF THE INVENTION

One form of the present invention is a unique call distribution and routing technique. Other forms include unique systems and methods to distribute calls among multiple call centers.

Another form includes operating a computer system that has several client workstations and servers, and receiving an incoming call that is routed to a telephone of one of the client workstations after the respective operator agrees to accept the call. Another form includes operating a computer system that has several call center servers, and updating the call queues of each respective call center server with details about each incoming call at the other call center servers.

Yet other forms, embodiments, objects, advantages, benefits, features, and aspects of the present invention will become apparent from the detailed description and drawings contained herein.

DETAILED DESCRIPTION OF SELECTED EMBODIMENTS

Figure 1:
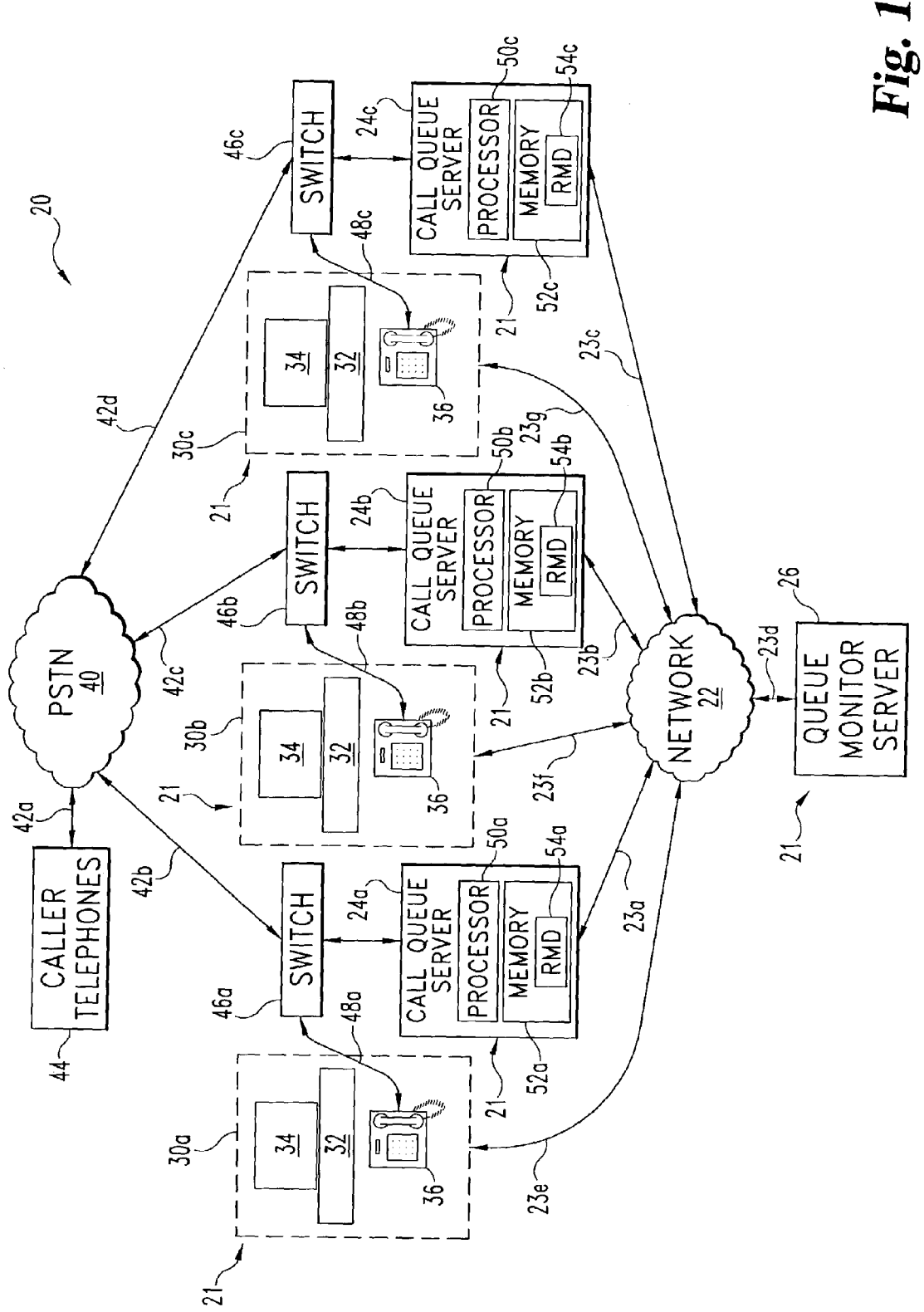
FIG. 1 is a diagrammatic view of a computer system of one embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

One embodiment of the present invention includes a unique system for distributing and routing calls in a call center. FIG. 1 is a diagrammatic view of computer system 20 of one embodiment of the present invention. Computer system 20 includes computer network 22. Computer network 22 couples together a number of computers 21 over network pathways 23. More specifically, system 20 includes several servers, namely Call Queue Servers 24a, 24b, and 24c, and a Queue Monitor Server 26. System 20 also includes agent client workstations 30a, 30b, and 30c. While computers 21 are each illustrated as being a server or client, it should be understood that any of computers 21 may be arranged to include both a client and server. Furthermore, it should be understood that while seven computers 21 are illustrated, more or fewer may be utilized in alternative embodiments.

Call Queue Servers 24a, 24b, and 24c include one or more processors or CPUs (50a, 50b, and 50c, respectively) and one or more types of memory (52a, 52b, and 52c, respectively). Each memory 52a, 52b, and 52c includes a removable memory device (54a, 54b, and 54c, respectively). Although not shown to preserve clarity, each computer 21 of system 20 includes one or more processors or CPUs and one or more types of memory. Each processor may be comprised of one or more components configured as a single unit. Alternatively, when of a multi-component form, a processor may have one or more components located remotely relative to the others. One or more components of each processor may be of the electronic variety defining digital circuitry, analog circuitry, or both. In one embodiment, each processor is of a conventional, integrated circuit microprocessor arrangement, such as one or more PENTIUM III or PENTIUM 4 processors supplied by INTEL Corporation of 2200 Mission College Boulevard, Santa Clara, Calif. 95052, USA.

Each memory (removable or generic) is one form of computer-readable device. Each memory may include one or more types of solid-state electronic memory, magnetic memory, or optical memory, just to name a few. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM); an optical disc memory (such as a DVD or CD ROM); a magnetically encoded hard disc, floppy disc, tape, or cartridge media; or a combination of any of these memory types. Also, each memory may be volatile, nonvolatile, or a hybrid combination of volatile and nonvolatile varieties.

System 20 further illustrates Public Switched Telephone Network (PSTN) 40 coupled to computer-controlled telephone switches 46a, 46b, and 46c (alternatively designated switches 46) of servers 24a, 24b, and 24c by pathways 42b, 42c, and 42d, respectively. Caller telephones 44 are coupled to PSTN 40 by pathway 42a. Switches 46 are also coupled to telephones 48a, 48b, and 48c (alternatively designated telephones 48). For the sake of clarity, each switch 46 is shown coupled to a corresponding telephone 48. However, is should be understood that each of telephones 48 may be coupled to one or more switches and that switches 48 may be located at one or more physical locations. Switches 46 may be arranged in the form of a Private Branch Exchange (PBX), predictive dialer, Automatic Call Distributor (ACD), a combination of these, or another switching configuration as would occur to those skilled in the art. Telephones 48 may be in the form of a handset, headset, or other arrangement as would occur to those skilled in the art. Telephones 48a, 48b, and 48c are each associated with a different one of agent workstations 30a, 30b, and 30c, respectively (collectively designated agent workstations 30). Agent workstations 30 each include an agent computer 32 coupled to a display 34. Agent computers 32 may be of the same type, or a heterogeneous combination of different computing devices. Likewise, displays 34 may be of the same type, or a heterogeneous combination of different visual devices. Although not shown to preserve clarity, each agent workstation 30 may also include one or more operator input devices such as a keyboard, mouse, track ball, light pen, and/or microtelecommunicator, to name just a few representative examples. Also, besides display 34, one or more other output devices may be included such as loudspeaker(s) and/or a printer.

Computer network 22 can be in the form of a Local Area Network (LAN), Municipal Area Network (MAN), Wide Area Network (WAN), such as the Internet, a combination of these, or such other network arrangement as would occur to those skilled in the art. The operating logic of system 20 can be embodied in signals transmitted over network 22, in programming instructions, dedicated hardware, or a combination of these. It should be understood that more or fewer computers 21 can be coupled together by computer network 22. It should also be recognized that computer network 22 may include one or more elements of PSTN 40. Indeed, in an alternate embodiment, PSTN 40 and computer network 22 are provided as a common network.

In one embodiment, system 20 operates as a call center at one or more physical locations that are remote from one another with call queue servers 24a, 24b, and 24c being configured as call center server hosts, server computer 26 being configured as a queue monitor server, and agent workstations 30a, 30b, and 30c each arranged as a call center client host. Additional telephones 48 may be connected to switches 46 that each correspond to an additional client host to provide more agent workstations 30 (not shown). Typically call center applications of system 20 would include many more agent workstations of this type at one or more physical locations, but only a few have been illustrated in FIG. 1 to preserve clarity. Also, one or more servers 24 may be configured as a call center server host at one or more physical locations.

Alternatively or additionally, system 20 may be arranged to provide for distribution and routing of a number of different forms of communication, such as telephone calls, voice mails, faxes, e-mail, web chats, web call backs, and the like. Furthermore, business/customer data associated with various communications may be selectively accessed with system 20. This data may be presented to an agent at each agent workstation 30 by way of monitor 34 operatively coupled to the corresponding agent computer 32. Alternatively or additionally, this presented data may include a request that the agent accept the call before it is routed to them. In other words, routing from the requester only takes place in response to the agent's indication of acceptance.

Figure 2:
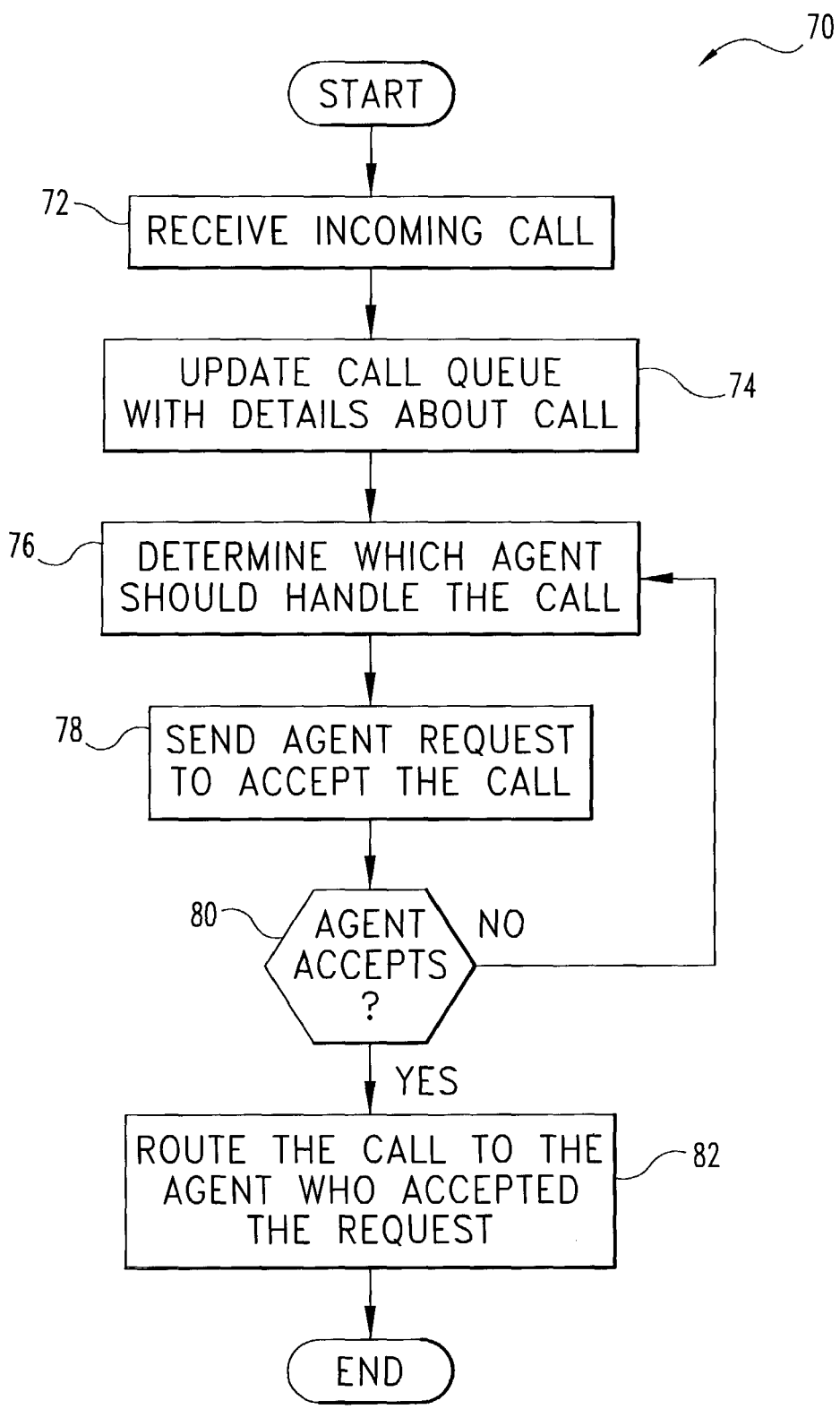
FIG. 2 is a process flow diagram for the system of FIG. 1 demonstrating the stages involved in delayed routing of calls.

Referring additionally to FIG. 2, one embodiment for implementation with system 20 is illustrated in flow chart form as routing procedure 70, which demonstrates a process for delaying the routing of a call until after an agent has provided an indication of acceptance of the call. In one form, procedure 70 is at least partially implemented in the operating logic of system 20. Procedure 70 begins with an incoming call being received (stage 72) at a call queue server 24a over switch 46a coupled to PSTN 40. The call queue of server 24a is updated with details about the call (stage 74). Server 24a determines which agent should handle the call (stage 76). Server 24a sends the desired agent a request to accept the call (stage 78). The agent that receives the request then determines whether to accept the call. If the agent accepts the call, then an indication of acceptance is provided by the agent (stage 80). The acceptance request can be presented to the agent in a variety of ways. As one non-limiting example, the acceptance request is presented by a dialog box on display 34 of agent workstation 30 that is accepted by selecting an affirmative indicator presented in the option. As another non-limiting example, the acceptance request can be made by causing telephone 36 at the respective agent workstation 30 to ring and with acceptance communicated/indicated by the agent picking up the telephone. Other variations for presenting and accepting a request to route a call are possible as would occur to one skilled in the art.

If the agent does accept the request to take the call (stage 80), then Server 24a routes or directs the call to the agent who accepted the request in response to the indication of agent acceptance (stage 82). That agent can be located at the same call center site as server 24a or at a call center site that is remotely located relative to the requesting call center site. However, if the agent does not accept the request to take the call (stage 80), then server 24a determines another agent to handle the call (stage 76) and repeats the stages until an agent accepts the request through a corresponding indication. Alternatively or additionally, a separate server other than call queue server 24a can be used to determine agent availability and/or to handle the call routing/directing to the accepting agent.

This routing procedure 70 delays routing the call to the agent until the agent actually agrees to accept the call. It has been found that this technique reduces the number of calls that are routed to an agent who otherwise appeared to be available at the time of routing initiation that become unavailable before the routing is completed—such as an agent who has since stepped away or taken another call while the earlier call was being routed. By delaying call routing/directing until after the agent has provided an indication of call acceptance, fewer calls will be routed/directed to an agent who then does not answer.

Figure 3:
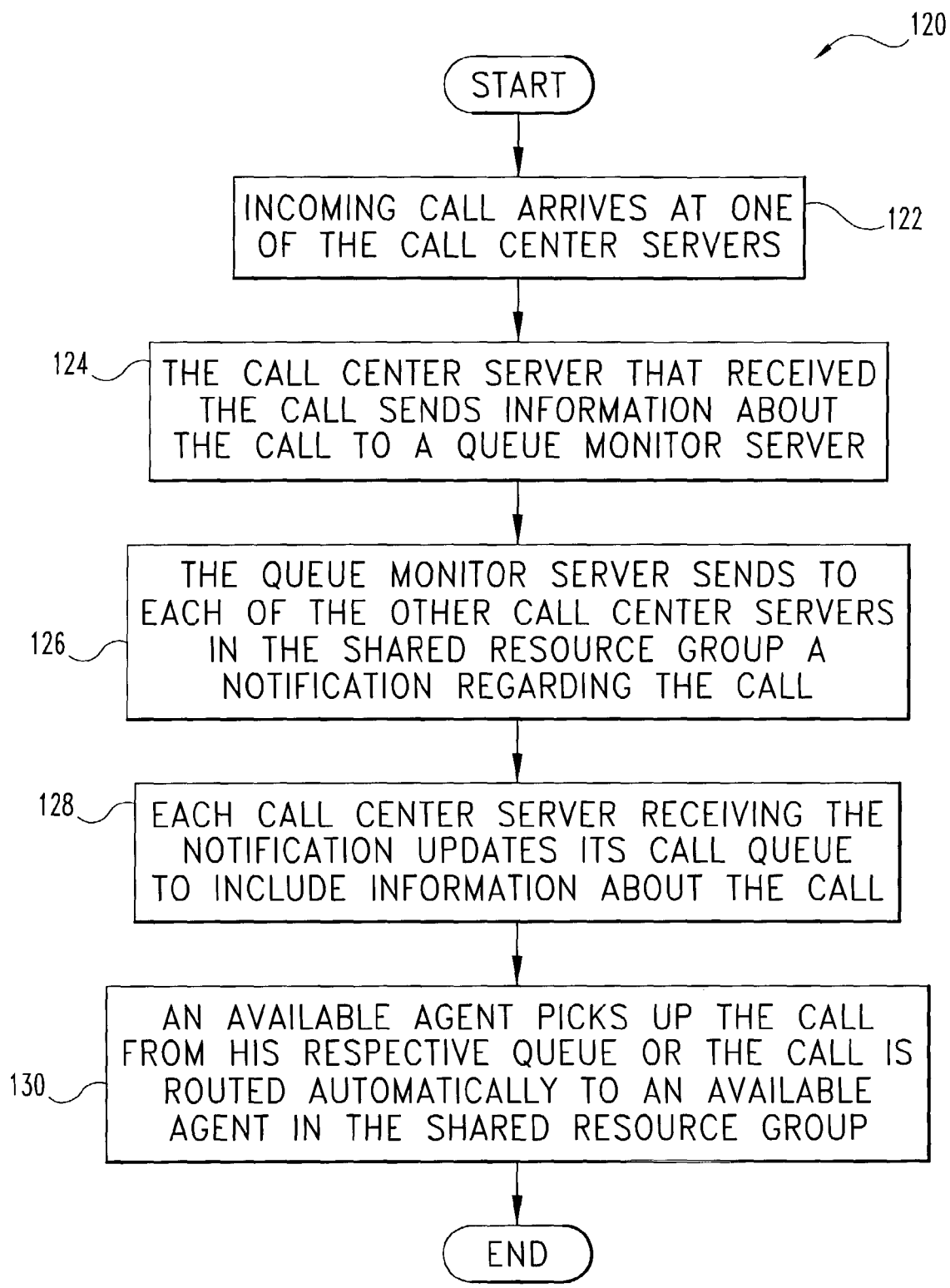
FIG. 3 is a process flow diagram for the system of FIG. 1 demonstrating the stages involved in managing call activity across multiple call centers.

Referring additionally to FIG. 3, another embodiment for implementation with system 20 is illustrated in flow chart form as procedure 120 for handling call distribution across multiple call center sites, such as in a global call center with call center sites at different remotely spaced geographic locations. In one form, procedure 120 is at least partially implemented in the operating logic of system 20. Procedure 120 begins with an incoming call arriving (stage 122) at one of the call center servers 24a at one geographic call center location over switch 46a coupled to PSTN 40. In alternate embodiments, the incoming call is a web chat or e-mail, to name a few examples. The call center server 24a that received the call sends information about the call to queue monitor server 26 (stage 124), which is located at the same or different location as incoming call center server 24a. Queue monitor server 26 sends to each of the other call center servers 24b and 24c, a notification regarding the call (stage 126). Call center servers 24b and 24c can be at the same geographic location or at one or more different geographic locations as incoming call center server 24*a*. Alternatively or additionally, queue monitor server 26 can reside on the same physical server as one of call center servers 24. Each call center server receiving the notification 24*b* and 24*c* updates its own respective call queue (stage 128) to include information about the incoming call.

Simultaneously with or after each queue is updated, the call is routed to an available agent telephone 36 (stage 130). Call center servers 24 each include logic for detecting agent availability and directing the call to an available agent. Agent availability can be detected in a number of ways, such as by determining if the agent's phone is presently in use, or by sending an acceptance request to the agent such as described in procedure 70, as a few non-limiting examples. As another non-limiting example, an available agent views on display 34 his respective call center queue and selects an option to pick up the call, thereby indicating that he is available and desires to take the call. Once agent availability is confirmed, the call is routed to that agent at their respective physical location. Routing is highly configurable and can take place in a variety of ways, such as call-put-back from the originating server to the destination server, or by voice-over-IP, as a few non-limiting examples. In the case where a call comes in on a particular server and a voice message needs to be left for an agent located at a different geographic location, one non-limiting option is to use a tie line to keep the call on the originating server for leaving the message. Keeping the call on the originating server in this example saves resources and avoids unnecessary routing. A variety of other agent availability detection and routing procedures are possible, and can alternatively or additionally be performed on one or more servers other than call center server 24. Alternatively or additionally, queue monitor server 26 can reside on the same physical server as one of call center servers 24. For each call that comes in on one of the call center servers 24, procedure 120 repeats.

In effect, a global view of all call activity across each call center in the shared resource group is displayed in the respective queue on each call center server 24. Stated another way, it can be said that queue monitor server 26 receives a notification from each originating call center server 24 and then replicates details about each incoming call to each of remaining call center servers 24, so that their respective queues are always current with all present activity across all call center servers 24. This allows call center servers located at the same and remote geographic locations to share queue information and thus share workload according to available agent resources and skills. Alternatively or additionally, queue monitor server 26 initially receives a notification of current activity on each call center server 24 and then notifies each call center server 24 with an initial list of call activity so each queue can be populated with the initial global view.

In a preferred embodiment, if the queue monitor server 26 fails, each respective call center server 24 can continue receiving and processing calls on its respective server, but a view of the activity across the other call centers is no longer available. Alternatively or additionally, a fail-over queue monitor server 26 can be utilized when the primary queue monitor server 26 fails to ensure that the other call queues are still updated with the complete view of all activity.

In one embodiment, a method according to the present invention includes: receiving an incoming call on an originating server of a call center; updating a queue with information about the incoming call; selecting an agent to handle the incoming call; sending the agent a request to accept the incoming call; and only routing the incoming call to the agent if the agent accepts the request.

In another embodiment, a method is disclosed that comprises: operating a call center including one of a number of call center servers; receiving an incoming call with a corresponding one of the call center servers; sending a first notification about the incoming call from the corresponding one of the call center servers to a queue monitor server; and sending a second notification about the incoming call from the queue monitor server to each of the number of call center servers.

In yet a further embodiment, a system according to the present invention includes: a plurality of call center servers, each of the plurality of call center servers including a call queue; and a queue monitor server coupled to each of the plurality of call center servers over a network, the queue monitor server receiving a call status update from one of the plurality of call center servers and sending a notification to each of the plurality of call centers in response to the call status update to maintain the call queue of each of the plurality of call center servers with an updated list of call activity across the plurality of call center servers.

In another embodiment, a system is disclosed that comprises: a plurality of call center servers, each of the plurality of call center servers including means for queuing calls; and a queue monitor server coupled to each of the plurality of call center servers over a network, the queue monitor server including means for receiving a call status update from one of the plurality of call center servers and means for sending a notification to each of the plurality of call centers in response to the call status update to maintain the queuing means of each of the plurality of call center servers with an updated list of call activity across the plurality of call center servers.

In yet a further embodiment, an apparatus is disclosed that comprises a computer-readable device carrying logic operable to receive a call status update from each of a plurality of call center servers, the logic being further operable to send a notification to each of the plurality of call center servers in response to the call status update to maintain a call queue of each of the plurality of call center servers with an updated list of call activity across the plurality of call center servers.

In another embodiment, an apparatus is disclosed that comprises a computer-readable device carrying logic operable to select an agent for handling an incoming call, the logic being further operable to send an acceptance request to the agent and to route the incoming call to the agent only if the agent accepts the request.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the inventions as described herein and/or by the following claims are desired to be protected.

What is claimed is:

1. A method comprising:
    receiving a call on a first server at a first call center site of a call center;
    updating a queue with information about the call;
    selecting an agent at a second call center site to handle the call, the second call center site being at a different location than the first call center site;
    sending the agent a request to accept the call;
    receiving an indication of acceptance by the agent at the first call center site; and
    routing the call from the first call center site to the agent at the second call center site in response to said receiving.

2. The method of claim 1, wherein the agent accepts the request by taking a telephone off hook.

3. The method of claim 1, wherein the agent accepts the request by selecting an option on a computer screen.

4. The method of claim 1, wherein said routing includes communicating between the first server at the first call center site and a second sewer at a second call center site.

5. The method of claim 1, further comprising:
determining that the agent did not accept the request;
selecting an alternate agent to handle the call;
sending the alternate agent a request to accept the call; and
directing the call from the first call center site to the alternate agent at a third call center site if the alternate agent accepts the request.

6. The method of claim 5, wherein said determining that the agent did not accept the request, said selecting an alternate agent, and said sending the alternate agent a request is repeated until the call is accepted by and routed to the alternate agent.

7. A method comprising:
operating a call center including one of a number of call center servers;
receiving an incoming call with a corresponding one of the call center servers;
sending a first notification about the incoming call from the corresponding one of the call center servers to a queue monitor server; and
sending a second notification about the incoming call from the queue monitor server to each of the number of call center servers.

8. The method of claim 7, farther comprising:
selecting an agent from the call center to handle the incoming call;
detecting the availability of the agent to handle the incoming call; and
routing the incoming call to the agent if the agent is available.

9. The method of claim 8, wherein said detecting the availability of the agent and said routing the incoming call to the agent comprises:
sending the agent a request to accept the incoming call; and
routing the incoming call to the agent if the agent accepts the request.

10. The method of claim 9, wherein the agent accepts the request by picking up a telephone.

11. The method of claim 9, wherein the agent accepts the request by selecting an option on a computer screen.

12. The method of claim 8, wherein said detecting the availability of the agent and said routing the incoming call to the agent comprises:
detecting whether a telephone associated with the agent is in use; and
only routing the incoming call to the agent if the telephone associated with the agent is not in use.

13. The method of claim 7, further comprising:
routing the incoming call to an agent who views a call queue of one of the number of call center servers and then selects an option to pick-up the incoming call.

14. The method of claim 7, wherein the call center is located at multiple geographic locations.

15. The method of claim 7, wherein the number of call center servers are in multiple, remotely spaced apart locations.

16. The method of claim 7, wherein the incoming call is a voice call.

17. The method of claim 7, wherein the incoming call is a web chat.

18. The method of claim 7, wherein the incoming call is an e-mail.

19. A system comprising:
a plurality of call center sex-vets, each of the plurality of call center servers including a call queue; and
a queue monitor server coupled to each of the plurality of call center servers over a network, the queue monitor server receiving a call status update from one of the plurality of call center servers and sending a notification to each of the plurality of call centers in response to the call status update to maintain the call queue of each of the plurality of call center servers with an updated list of call activity across the plurality of call center servers.

20. The system of claim 19, wherein the queue monitor server initially receives a notification of current call activity on each of the plurality of call center sewers, and notifies each of the plurality of call center servers with an initial list of call activity across the plurality of call center servers.

21. The system of claim 19, wherein the plurality of call center servers are located at a number of geographic locations.

22. The system of claim 19, wherein the queue monitor server and one of the plurality of call center servers are the same server.

23. The system of claim 19, wherein each of the plurality of call center servers contain logic for detecting the availability of a plurality of agents and routing an incoming call to a particular available agent.

24. The system of claim 23, wherein the logic sends an acceptance request to one of the plurality of agents to detect availability.

25. A system comprising:
a plurality of call center servers, each of the plurality of call center servers including means for queuing calls; and
a queue monitor server coupled to each of the plurality of call center servers over a network, the queue monitor server including means for receiving a call status update from the of the plurality of call center servers and means for sending a notification to each of the plurality of call centers in response to the call status update to maintain the queuing means of each of the plurality of call center servers with an updated list of call activity across the plurality of call center servers.

26. A method, comprising:
receiving a first call with a first server;
updating a queue with information about the first call;
receiving a second call with a second server located at a different geographic location from said first server;
updating said queue with information about the second call:
selecting an agent to receive the first call;
sending the agent a request to accept the first call;
receiving an indication of acceptance of the request from the agent; and
directing the first call to the agent after said receiving.

27. The method of claim 26, wherein the first server and the agent are at different call center sites.

28. The method of claim 26, which includes communicating between the first server and a third server, the third server being a queue monitor that is operable to provide updated call queues of each of a plurality of call queue servers, the first and second server being one of the call queue servers.

* * * * *

UNITED STATES PATENT AND TRADEMARK OFFICE
CERTIFICATE OF CORRECTION

PATENT NO. : 7,110,523 B2
APPLICATION NO. : 10/449249
DATED : September 19, 2006
INVENTOR(S) : Gagle et al.

It is certified that error appears in the above-identified patent and that said Letters Patent is hereby corrected as shown below:

In column 7, line 7, please change "site and a second sewer at a second call center site." to --site and a second server at a second call center site.--

In column 8, line 4, please change "a plurality of call center sex-vets, each of the plurality of" to --a plurality of call center servers, each of the plurality of--

In column 8, line 17, please change "on each of the plurality of call center sewers, and notifies" to --on each of the plurality of call center servers, and notifies--

In column 8, line 40, please change "update from the of the plurality of call center servers" to --update from one of the plurality of call center servers--

In column 8, line 52, please change "call:" to --call;--

Signed and Sealed this

Nineteenth Day of December, 2006

JON W. DUDAS
*Director of the United States Patent and Trademark Office*